Dec. 3, 1935.  A. VANG ET AL  2,022,905

THERMOSTATIC PISTON

Filed May 25, 1934  3 Sheets-Sheet 1

INVENTORS.
ALFRED VANG
JOHN A. KIENLE
BY Barnes, Kisselle, Laughlin & Raisch
ATTORNEYS.

Dec. 3, 1935.  A. VANG ET AL  2,022,905
THERMOSTATIC PISTON
Filed May 25, 1934   3 Sheets-Sheet 2
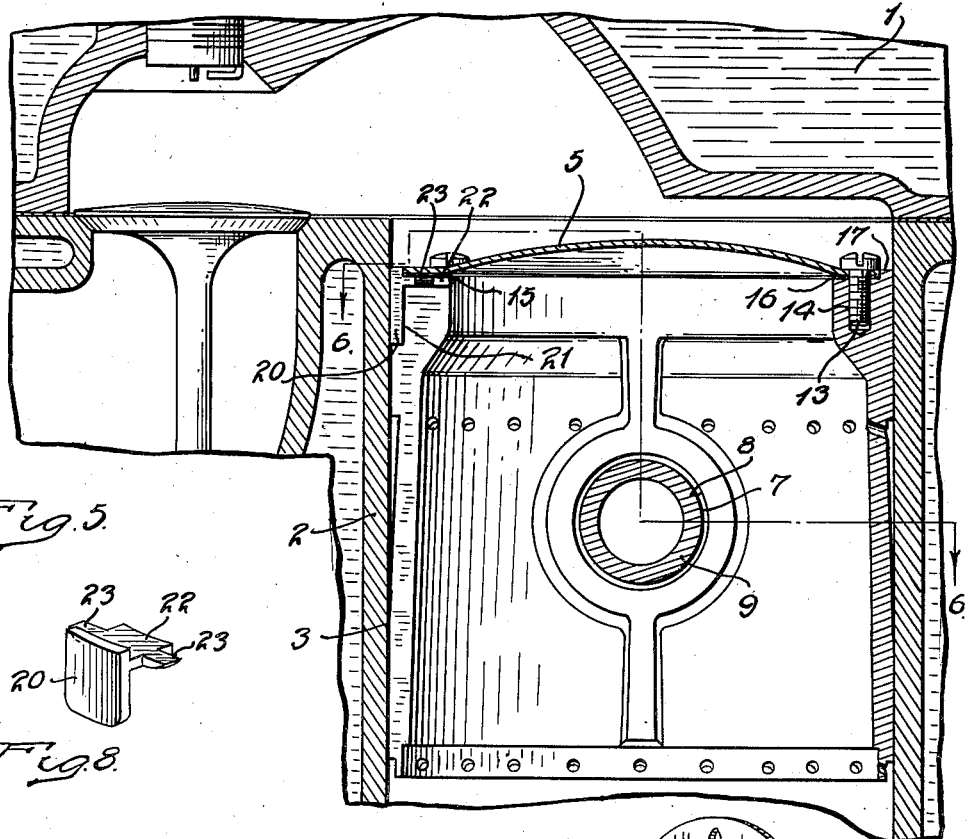
Fig. 5.
Fig. 8.
Fig. 7.
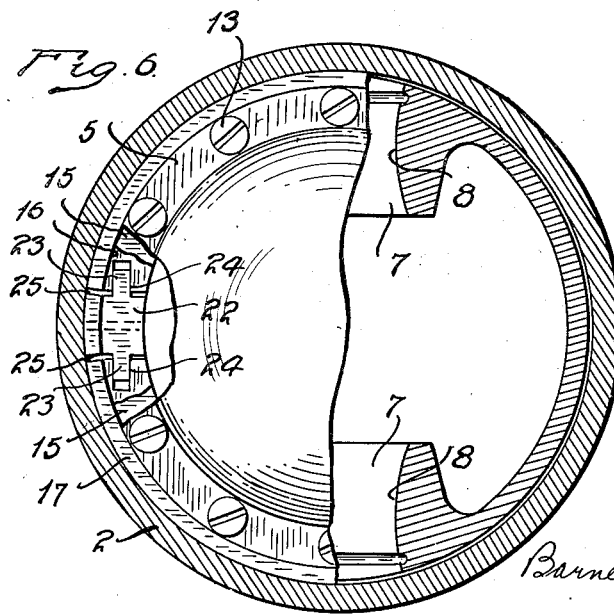
Fig. 6.
INVENTORS.
ALFRED VANG.
BY John A. Kienle
Barnes, Kisselle, Laughlin & Raisch
ATTORNEYS.

Dec. 3, 1935.　　　A. VANG ET AL　　　2,022,905
THERMOSTATIC PISTON
Filed May 25, 1934　　　3 Sheets-Sheet 3
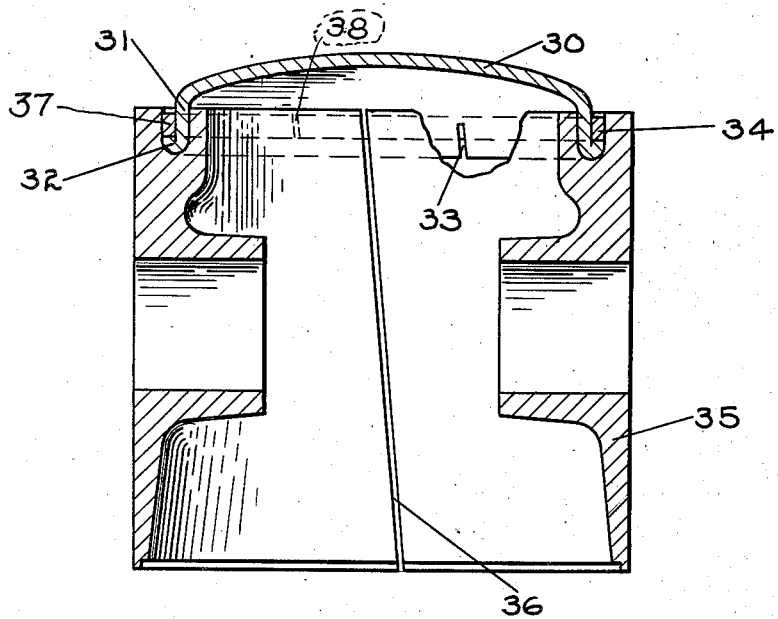
FIG. 9
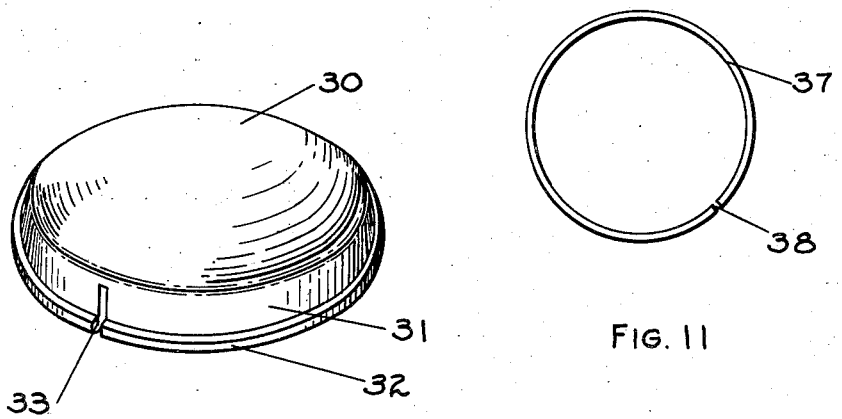
FIG. 10
FIG. 11
INVENTORS.
Alfred Vang
John A. Kienle
BY
Barnes, Kisselle, Laughlin & Raisch
ATTORNEYS.

Patented Dec. 3, 1935

2,022,905

UNITED STATES PATENT OFFICE 2,022,905

THERMOSTATIC PISTON

Alfred Vang and John A. Kienle, Detroit, Mich., assignors of one-third to Herbert B. Trix, Detroit, Mich.

Application May 25, 1934, Serial No. 727,426

21 Claims. (Cl. 309—11)

This invention relates to a thermostatically controlled piston, and more particularly to a thermostatically controlled piston for an internal combustion engine.

It is the present practice in the construction of pistons for internal combustion engines to make the piston with an outside diameter sufficiently less than that of the cylinder in which the piston reciprocates to accommodate the increase in the outside diameter of the piston due to expansion of the metal caused by the heat incurred in operation of the engine. The piston is suitably grooved and provided with well-known expansible circular piston rings which provide an imperfect seal between the piston and the cylinder walls and reduce compression and power losses.

It is the object of this invention to produce a piston that will operate efficiently without a piston ring and thus obviate the need for piston rings. This object has been achieved by producing a piston the outside diameter of which will be controlled so that the clearance between the piston and cylinder wall may be maintained approximately constant regardless of temperature change. More particularly this object has been attained by producing a piston with a head having different expansion characteristics than the skirt for controlling the outside diameter of the piston to obtain the desired clearance between the piston and cylinder under all operating conditions.

It is an object of this invention to produce a piston that initially can be given a nice fit in the cylinder free from compression and power losses and which nicety of fit will be maintained regardless of the variations in temperature incurred in operation of the engine. This object has been achieved by producing a piston which will yield or spring when stressed to increase or decrease its outside diameter, and more particularly by stressing the piston by heat responsive means arranged to stress the piston in opposition to the expansion or contraction of the piston caused by an increase or decrease in operating temperature.

Since, in the operation of an engine, the metal of the piston will expand when the operating temperature rises thereby increasing the outside diameter of the piston and will contract when the operating temperature falls thereby decreasing the outside diameter of the piston, this invention contemplates the controlling of this expansion or contraction of the piston due to temperature change by making the piston yieldable and applying a stress to this piston set up by thermostatic bi-metal or heat responsive means in opposition to either the expansive or contractive forces caused by a rise or fall in temperature.

More particularly this invention contemplates a piston the skirt portion of which comprises a split cylinder and the head of which comprises a disc of thermostatic bi-metal secured along its circumference to the skirt.

This invention further contemplates a piston having a skirt which comprises a split cylinder and a thermostatic bi-metal head in the form of a convex disc of thermostatic metal which is secured to the skirt along its circumference.

Another point of novelty in the invention resides in the device which seals the split in the skirt against compression and power losses and at the same time permits free opening or closing movement of the split skirt.

Another feature of novelty resides in the rounded openings provided in the skirt for reception of the pin which connects the connecting rod to the piston and which thereby permits opening or closing movement of the piston without creating any bind between the pin and the openings provided therefor in the piston skirt.

In the drawings:

Fig. 5 is a section along the line 5—5 of Fig. 1.

Fig. 6 is a section along the line 6—6 of Fig. 5.

Fig. 7 is a perspective showing the thermostatic bi-metal head.

Fig. 8 is a detail showing the sealing member for sealing the upper end of the slot in the skirt of the piston against compression and power losses.

Fig. 9 is a sectional view of the piston showing a modified form of the bi-metallic head.

Fig. 10 is a perspective of the modified bi-metallic head.

Fig. 11 shows the ring for attaching the head to the skirt.

Figure 1:
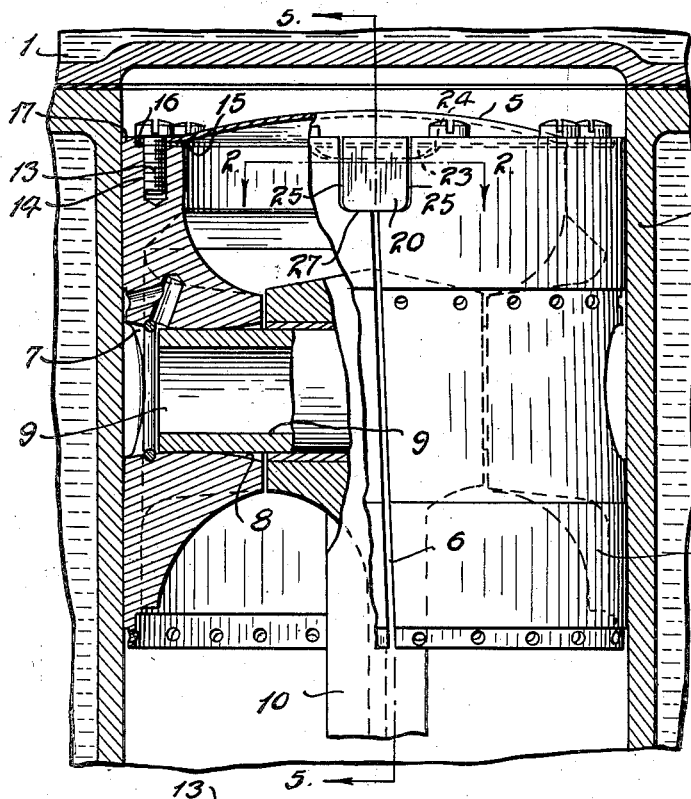
Fig. 1 is a side elevation partly in section showing the piston with the thermostatic bi-metal head in the position it assumes when the motor is cool, such as before the motor is started or immediately thereafter.
Figure 2:
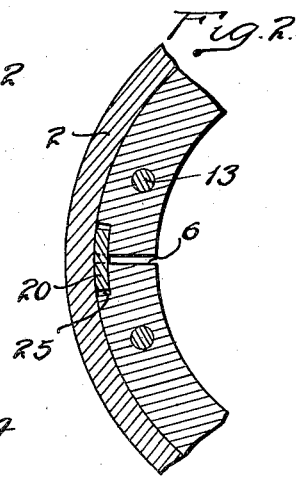
Fig. 2 is a section along the line 2—2 of Fig. 1.

Referring more particularly to the drawings there is shown a fragment 1 of an internal combustion engine having a cylinder 2 arranged to receive the novel form of piston, generally designated 3, which is the subject of this invention. The piston comprises a skirt portion 4 and a head portion 5. The skirt may be made of any suitable metal such as steel or iron although an aluminum or aluminum alloy piston is preferred.

The skirt 4, contemplated by this invention, should be yieldable under stress, that is, at any given temperature the piston should be such that the outside diameter or circumference of the piston can be increased or decreased when stressed without this increase or decrease being caused by the expansion or contraction of the metal from which the piston is made caused by a rise or fall in temperature. It is desirable that this yieldability of the piston at any given temperature to increase or decrease its outside diameter or circumference should fall within a range of a few thousandths of an inch and in actual practice it has been found that a range of three thousandths of an inch is satisfactory. This range, of course, can be varied to suit the conditions obtaining, such as the operating temperatures and the kind of metal from which the piston is constructed. Preferably, this yieldability of the piston can be obtained when the skirt of the piston takes the form shown, namely, that of a cylinder having a longitudinal split 6 extending through one wall from the top to the bottom of the skirt. This in effect makes the piston skirt a split cylindrical ring.

The skirt of the piston is provided with diametrically opposed openings 7, the surfaces of which are curved as at 8 (Figs. 1, 3, 6 and 7). The openings 7 are arranged to receive the pin 9 which operatively connects the connecting rod 10 to the piston. The reason for providing the pin openings 7 with the curved surfaces 8 is to permit the piston to yield when stressed without setting up any bind between the pin 9 and the openings 7. As the piston yields when stressed the curved surfaces 8 in a sense rock upon the pin 9 to permit free relative movement between the pin 9 and the openings 7. The wrist pin 9 has a drive fit in the opening 8 of the piston boss at room temperature. The pin 9 is made from steel and the piston from aluminum. During operation, since the coefficient of expansion of aluminum is greater than that of steel, the boss expands more than the pin 9 thus providing sufficient working clearance between the pin 9 and the opening 8.

The head 5 of the piston is shown in detail in Fig. 7 and takes the form of a curved or convex disc. Preferably the thermostatic head 5 is a bi-metallic element such as described and/or claimed in the William M. Chace United States Patent No. 1,642,485, issued September 13, 1927, but the percentage of the several metals in the members of the element may be varied to suit the conditions under which the piston operates.

Figure 3:
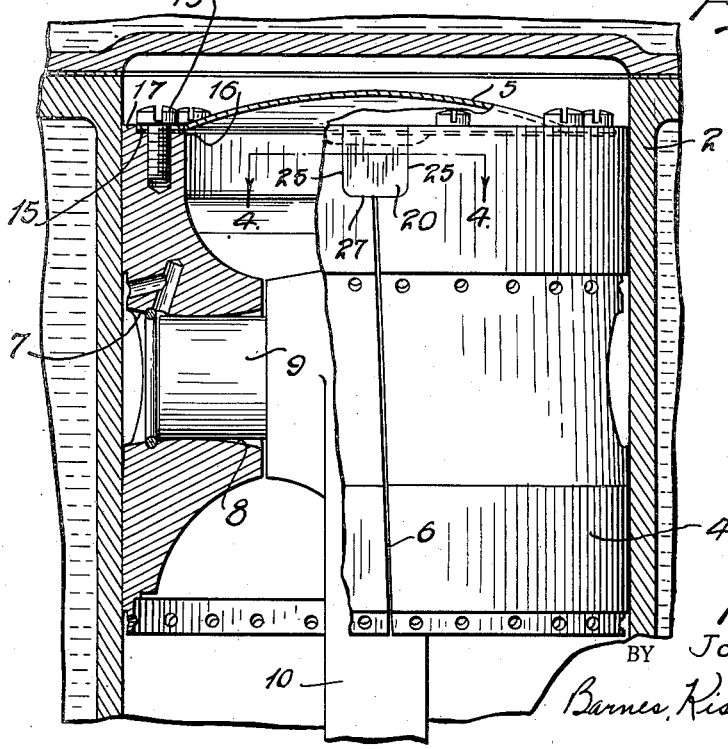
Fig. 3 is a view similar to Fig. 1 showing an exaggerated view of the position the thermostatic head assumes after the motor has been warmed up.
Figure 4:
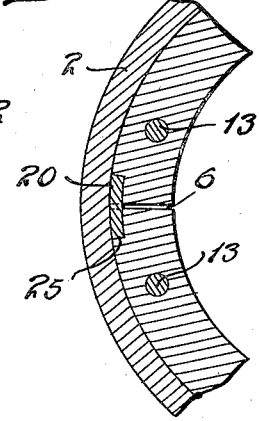
Fig. 4 is a section along the line 4—4 of Fig. 3.

The head 5 is preferably convex as viewed from the top of the piston, that is, it is curved upwardly as viewed in Figs. 1, 3 and 5. The head 5 is preferably curved upwardly for the reason that during operation of the engine the head 5 expands still upwardly and thus decreases the compression space in the cylinder and engine head between the top of the piston and the upper end of the cylinder. This increases the compression to which the gas is subjected. In other words, by making the head 5 of the piston convex the compression rating of the engine is somewhat increased thereby increasing the efficiency of the motor.

The thermostatic bi-metal head 5 is preferably secured in gas-tight relation along its periphery to the upper end of the skirt 4. To this end the disc 5 is provided with a plurality of openings 12 through which a plurality of screws 13 are passed and turned in to suitable threaded openings 14 in the skirt to secure the head 5 in gas-tight relation with the skirt 4. A suitable bronze or copper gasket 15 may be inserted between the skirt and the head. Preferably the circumference of the disc 5 is somewhat less than that of the skirt 4. The skirt 4 is provided with a peripheral seat 16 for the head 5 bounded on the outside by the circumferential shoulder 17.

Inasmuch as the split 6 extends longitudinally from the top to the bottom of the skirt and completely through the wall, it is essential that the split 6 is sealed to prevent compression and power losses. Preferably this sealing is done at the upper end of the split. The sealing is achieved by means of an insert 20, preferably bronze, which is fitted into an opening 21 in the side wall of the piston extending on each side of the split 6. As shown in Fig. 6, the member 20 is arcuate to conform to the cylindrical surface of the skirt. The insert 20 is provided with a lug 22 projecting radially inwardly of the skirt. This lug in turn has two opposed ears 23 which have a sliding fit in slots 24 provided in the face of the seat 16. As the skirt opens and closes relative movement occurs between the ears 23 and the slots 24, but the insert 20 remains securely held in place. The arcuate portion of the insert 20 has a clearance 25 preferably along each side of the side walls of the recess 21. The clearance 25 may be several thousandths of an inch but in actual practice a clearance of about three thousandths of an inch has been found satisfactory. It will be noted, however, that the bottom face of the insert 20 has a sliding sealing engagement as at 27 with the bottom face of the recess 21 and thus effectively seals the split 6 from the compression chamber of the cylinder. The projecting portion 22 of the insert, as shown in Fig. 5, is held in gas-tight relation with the thermostatic bi-metal head 5. By this sealing device 20 the skirt 4 is permitted to open and close during operation, but at the same time the split 6 is effectively sealed against compression and power losses.

Briefly, the operation of the piston is as follows: Figure 1 shows the piston with about .001 of an inch clearance with the cylinder wall. As soon as the engine is set in operation the temperature rises. This rise in temperature causes the metal in the skirt 4 of the piston to expand thus tending to enlarge the outside diameter of the piston. At the same time the rise in temperature causes the thermostatic bi-metal head 5 to respond, the inner or central portion expands upwardly from the position shown in Fig. 1 to that shown in Fig. 3 and the circumferential edge is drawn in. As the convex head 5 expands in response to a temperature rise the outside diameter or circumference of the head 5 is consequently decreased thus applying an inwardly directed stress upon the piston skirt 4. Since the piston skirt 4 is yieldable the skirt 4 is sprung or flexed inwardly. This narrows the slit 6 as is brought out in the exaggerated showing in Figs. 1 and 3. Hence, the increase in the outside diameter of the piston which would otherwise result from the expansion of the metal in the piston due to a rise in temperature is counteracted by the stress of the thermostatic bi-metal head 5 tending to decrease the outside diameter of the piston. The result is that the change of the outside diameter of the piston is controlled so that the desired clearance between the piston and the cylinder is obtained under all operating conditions and the difference between the expansion of the piston and the expansion of the cylinder wall upon a rise in operating temperature (or the difference between the contraction of the piston and the contraction of the cylinder wall upon a fall in operating temperature) is compensated for by the action of the piston head.

If a fall in operating temperature occurs the opposite action from that described above takes place, namely, the skirt 4 contracts thus tending to reduce the outside diameter of the piston skirt. However, at the same time, the thermostatic bi-metal head 5 tends to flatten out thereby increasing its outside diameter which sets up a stress on the yieldable skirt tending to enlarge its outside diameter. This outward or opening stress of the thermostatic bi-metal head 5 counteracts the contracting forces set up in the skirt by the fall in temperature and the result is that change of the outside diameter of the piston is controlled so as to maintain the desired clearance between the piston and cylinder walls.

In the modified form of the invention the bi-metallic head 30 is crowned or convex the same as the head 5 but in addition is provided with the depending circumferential flange 31 which has a return bent portion 32 forming a shoulder. The circumferential flange 31 is provided with a slot 33 of less depth than the circumferential groove 34 in the upper end of the piston skirt 35. This slot improves the action of the bi-metal head 30. The piston skirt 35 is provided with a longitudinal slit 36 and is otherwise the same as that in the principal form of the invention. The bi-metallic head 30 is assembled to the skirt 35 by inserting the depending flange 31 in the circumferential groove 34 with the slot 33 offset from the slit 36. Thereafter the split ring 37 is pressed into this groove 34 against the shoulder provided by the return bent portion 32 of the bi-metallic head. The split 38 of the ring 37 is offset from the slit 36 of the piston skirt and the slot 33 in the circumferential depending flange 31 of the bi-metallic head. The press fit of the ring 37 in the groove 34 securely attaches the head 30 to the skirt 35.

The operation of this modified form of the invention is similar to that of the principal form and appears to give somewhat of an improved action both in circumferential contraction as the temperature of the engine rises as well as in circumferential expansion as the temperature of the engine falls. This may be due to what appears to be a double expanding and contracting action, that is, not only the circumferential edge of the crowned portion of the bi-metallic head contracts as the temperature rises, as explained above relative to the principal form of the invention, but the circumferential depending flange 31 also contracts or moves radially inwardly. The opposite action occurs upon a fall in temperature.

In the principal form of the invention, as well as in the modified form, the bi-metallic heads 5 and 30 have the metal with the higher coefficient of expansion on the outer or top side, that is, the high-expanding metal should be on the outside of the curve.

The terms "skirt", "wall", and "side wall" of the piston are used synonymously herein and denote the cylindrical portion 4 of the cylinder which extends from the bottom edge of the cylinder to the bi-metal head 5.

We claim:

1. A piston comprising a wall having a slot extending through the wall and from the bottom edge to the piston head the outside diameter of which tends to increase upon a rise in operating temperature and tends to decrease upon a fall in operating temperature, and a heat responsive head which contracts upon a rise in temperature and expands upon a fall in temperature, means for securing said head to said wall, said head acting on said wall for applying a stress in opposition to the expansion forces in the piston wall caused by a rise in temperature and applying a stress in opposition to the contracting forces set up in the piston wall by a decrease in operating temperature whereby the change in outside diameter of the piston is controlled.

2. A piston comprising a yieldable wall the outside diameter of which tends to increase upon a rise in operating temperature and tends to decrease upon a fall in operating temperature, and a heat responsive head which contracts upon a rise in emperature and expands upon a fall in temperature, means for securing said head to said wall, said head acting on said wall for applying a stress in opposition to the expansion forces in the piston wall caused by a rise in temperature and applying a stress in opposition to the contracting forces set up in the piston wall by a decrease in operating temperature whereby the change in the outside diameter of the piston is controlled.

3. A piston adapted for reciprocation in a cylinder comprising a head for receiving a fluid impact, a cylindrical side wall having a slit extending through the wall and from the bottom edge of the wall to the piston head, the outside diameter of the wall tending to increase upon a rise in operating temperature and tending to decrease upon a fall in operating temperature, and heat responsive means which contracts upon a rise in temperature and expands upon a fall in temperature, for applying a stress in opposition to the expansion forces in the piston wall set up by a rise in temperature and applying a stress in opposition to the contracting forces set up in the piston wall by a decrease in operating temperature, means for securing said heat responsive means to said wall whereby the piston wall yields to the stress of the heat responsive means to control the change in the outside diameter of the wall so that the desired clearance between the piston and the cylinder may be maintained under all operating conditions.

4. A piston comprising a cylindrical wall having a slit extending through the wall and from the top to the bottom edge, the outside diameter of the wall tending to increase upon a rise in operating temperature and tending to decrease upon a fall in operating temperature, and a heat responsive head which contracts upon a rise in temperature and expands upon a fall in temperature, means for securing said head to said wall, said head acting on the wall for applying a stress in opposition to the expansion forces in the piston wall set up by a rise in temperature and applying a stress in opposition to the contracting forces set up in the piston wall by a decrease in operating temperature whereby the piston wall yields to the stress of the heat responsive means to control the change in the outside diameter of the wall.

5. A piston comprising a cylindrical skirt having a slit extending through the wall and from the top edge to the bottom edge, and a heat responsive means which contracts upon a rise in temperature and expands upon a fall in temperature, means securing said heat responsive means along its circumference to the skirt in gas-tight relation for applying a stress in opposition to the expansion forces in the skirt caused by a rise in temperature and applying a stress in opposition to the contracting forces in the skirt caused by a decrease in temperature whereby the change in the outside diameter of the skirt of the piston is controlled.

6. A piston comprising a cylindrical skirt having a slit extending through the wall and from the top edge to the bottom edge, and a heat responsive head which contracts upon a rise in temperature and expands upon a fall in temperature, means securing said heat responsive head along its circumference to the skirt in gas-tight relation for applying a stress in opposition to the expansion forces in the skirt caused by a rise in temperature and applying a stress in opposition to the contracting forces in the skirt caused by a decrease in temperature whereby the change in the outside diameter of the skirt of the piston is controlled.

7. A piston comprising a cylindrical skirt having a slit extending through the wall and from the top edge to the bottom edge, and a bi-metallic disc, means securing said bi-metallic disc along its circumference in gas-tight relation with the upper end of the skirt for applying a stress in opposition to the expansion forces in the skirt caused by a rise in temperature and applying a stress in opposition to the contracting forces in the skirt caused by a decrease in temperature whereby the change in the outside diameter of the skirt of the piston is controlled.

8. A piston comprising a cylindrical skirt having a slit extending through the wall and from the top edge to the bottom edge, and a bi-metallic convex disc, means securing said bi-metallic convex disc along its circumference in gas-tight relation with the upper end of the skirt for applying a stress in opposition to the expansion forces in the skirt caused by a rise in temperature and applying a stress in opposition to the contracting forces in the skirt caused by a decrease in temperature whereby the change in the outside diameter of the skirt of the piston is controlled.

9. A piston comprising a cylindrical skirt having a slit extending through the wall and from the top edge to the bottom edge, and a piston head for receiving the power impact comprising a bi-metallic convex disc, means securing said bi-metallic convex disc along its circumference in gas-tight relation with the upper end of the skirt whereby the bi-metallic disc responds to a rise in temperature to decrease its outside diameter and thereby apply a stress in opposition to the expansion forces in the skirt caused by a rise in temperature and the bi-metallic disc responds to a fall in temperature to increase its outside diameter thereby applying a stress to the skirt in opposition to the contracting forces set up in the skirt by the decrease in temperature.

10. A piston comprising a cylindrical skirt having a slit extending through the wall and from the top edge to the bottom edge, and a bi-metallic convex disc, means securing said bi-metallic convex disc along its circumference in gas-tight relation with the upper end of the skirt for applying a stress in opposition to the expansion forces in the skirt caused by a rise in temperature and applying a stress in opposition to the contracting forces in the skirt caused by a decrease in temperature whereby the change in the outside diameter of the skirt of the piston is controlled, and means for sealing the slit in the skirt to prevent compression and power losses.

11. A piston comprising a cylindrical skirt having a slit extending through the wall and from the top edge to the bottom edge, and a bi-metallic convex disc, means securing said bi-metallic convex disc along its circumference in gas-tight relation with the upper end of the skirt for applying a stress in opposition to the expansion forces in the skirt caused by a rise in temperature and applying a stress in opposition to the contracting forces in the skirt caused by a decrease in temperature whereby the change in the outside diameter of the skirt of the piston is controlled, and a sealing member insertable in the wall of the skirt for sealing the slit against compression and power losses, the said member having a sliding interengagement with the side wall of the skirt.

12. A piston comprising a cylindrical skirt having a slit extending through the wall and from the top edge to the bottom edge, and a bi-metallic convex disc, means securing said bi-metallic convex disc along its circumference in gas-tight relation with the upper end of the skirt for applying a stress in opposition to the expansion forces in the skirt caused by a rise in temperature and applying a stress in opposition to the contracting forces in the skirt caused by a decrease in temperature whereby the change in the outside diameter of the skirt of the piston is controlled, said skirt having a seat in its side wall, a sealing member for sealing the slit in the side wall of the skirt positioned in the said seat and having a small clearance with the said seat along one side offset from the slit whereby the slit is maintained sealed when the skirt yields to the stress applied by the bi-metallic head.

13. In combination with a piston comprising a yieldable wall the outside diameter of which tends to increase upon a rise in operating temperature and tends to decrease upon a fall in operating temperature, heat responsive means which contracts upon a rise in temperature and expands upon a fall in temperature, and means for securing said heat responsive means to the yieldable wall, said heat responsive means applying a stress in opposition to the expansion forces in the piston wall caused by a rise in temperature and applying a stress in opposition to the contracting forces set up in the piston wall by a decrease in operating temperature whereby the piston yields to the stress applied by the heat responsive means to control the change in the outside diameter of the piston, a connecting rod, a pin for connecting the connecting rod to the piston, and opposed openings in the wall of the piston having curved surfaces for reception of the said pin to prevent binding between the pin and the opening when the piston wall yields to the stress set up by the said heat responsive means.

14. A piston comprising a cylindrical skirt having a slit extending through the wall from the top to the bottom edge and a bi-metallic crowned disc having a depending circumferential flange, a peripheral groove in the end of the cylindrical skirt for receiving the depending flange of the bi-metallic crowned disc, and means for locking the said flange in the said groove to secure the bi-metallic disc to the piston skirt.

15. A piston comprising a cylindrical skirt having a slit extending through the wall from the top to the bottom edge and a bi-metallic crowned disc having a depending circumferential flange, a peripheral groove in the end of the cylindrical skirt for receiving the depending flange of the bi-metallic crowned disc, a slot in the depending flange of the bi-metallic disc of less depth than that of the peripheral groove in the skirt and offset from the slit in the skirt, and a split ring insertable in the said groove for interengaging the depending flange of the bi-metallic disc and the skirt to secure the bi-metallic crowned disc to the skirt.

16. A piston comprising a cylindrical skirt extending through the wall from the top to the bottom edge, a bi-metallic head in the form of a crowned disc having a depending flange with a slot therein and terminating in a shoulder, a peripheral groove in the upper face of the skirt for receiving the depending flange of the bi-metallic head, the slit in the depending flange in the bi-metallic head being offset from the slit in the skirt, and a split ring insertable in the groove in engagement with the shoulder of the said flange for locking the bi-metal head to the piston skirt.

17. A piston comprising a cylindrical wall having a slit extending through the wall from the top to the bottom edge and a bi-metallic disc having a depending circumferential flange, a peripheral groove in the top end of the cylindrical wall for receiving the depending flange of the bi-metallic disc, the depending circumferential flange of the bi-metallic disc having a slot extending inwardly from its free edge and of less length than the portion of said flange in said peripheral groove, and means for locking the said flange in the groove to secure the bi-metallic disc to the piston wall.

18. A piston comprising a cylindrical wall, a piston head in the form of a bi-metallic crowned disc having a depending circumferential flange, the said cylindrical wall having a slit extending through the wall from the bottom edge to the bi-metallic head, a peripheral groove in the top end of the cylindrical wall for receiving the depending flange of the bi-metallic head, a slot extending inwardly from the edge of the depending flange of the bi-metallic head of less depth than that of the peripheral groove in the wall and offset from the slit in the wall, and means for locking the flange in said groove to secure the bi-metallic head to the piston wall.

19. A piston comprising a metallic cylindrical wall, a metallic head having thermal expansion characteristics opposite to those of the metal of said cylindrical wall, means for securing said head to said cylindrical wall in gas-tight relation to the cylindrical wall, the cylindrical wall having a slit extending through the wall throughout the length of the skirt from the bottom edge to the piston head whereby the change in the outside diameter of the piston when subjected to an increase or a decrease in operating temperature is controlled.

20. A piston adapted to reciprocate within a cylinder comprising a metallic cylindrical wall, a metallic head for receiving the power impact of the explosion having thermal expansion characteristics opposite to those of the metal of the cylindrical wall, means for securing the said head in gas-tight relation to the cylindrical wall, the cylindrical wall having a slit extending through the wall from the bottom edge to the piston head whereby the change in the outside diameter of the piston when subjected to an increase or a decrease in operating temperature is controlled so that the desired clearance between the piston and the cylinder may be maintained under all operating conditions and the difference in expansion and contraction of the piston and the expansion and contraction of the cylinder wall is compensated for by the action of the piston head.

21. A piston adapted to reciprocate within a cylinder comprising a head and a cylindrical wall, the cylindrical wall having a split extending through the wall throughout its entire length from the top to the bottom edge, a thermostatic bi-metal element, means securing the thermostatic bi-metal element to the said cylindrical wall whereby the change in the outside diameter of the piston wall when subjected to an increase or decrease in operating temperature is controlled so that the desired clearance between the piston and the cylinder may be maintained throughout the entire area of contact between the piston and the cylindrical wall under all operating conditions, a seat in the piston wall, a sealing member for sealing the split in the piston wall positioned in the said seat and having a small clearance with the seat along one side offset from the split to permit relative movement between the sealing member and the piston wall whereby the split is maintained sealed when the piston wall yields to the stress applied by the bi-metal element.

ALFRED VANG.
JOHN A. KIENLE.